United States Patent [19]

Broussard

[11] Patent Number: 4,488,752

[45] Date of Patent: Dec. 18, 1984

[54] EXPANDABLE MOBILE TRAILER

[76] Inventor: Alphe Broussard, 64 Avenue Mohamed Diouri, Kenitra, Morocco

[21] Appl. No.: 403,323

[22] Filed: Jul. 30, 1982

[51] Int. Cl.³ .............................................. B60N 3/34
[52] U.S. Cl. .................................... 296/171; 296/172; 296/26; 296/187; 296/203; 296/181
[58] Field of Search .............................. 296/175–176, 296/181, 26, 27, 171, 172, 187, 203, 205, 157, 158

[56] References Cited

U.S. PATENT DOCUMENTS

| | | | |
|---|---|---|---|
| 1,265,705 | 5/1918 | Litchfield | 280/405 |
| 1,314,498 | 9/1919 | Bower | 280/405 |
| 1,320,601 | 11/1919 | Caron | 280/405 |
| 1,419,160 | 6/1922 | McKinnon | 280/638 |
| 1,621,555 | 3/1927 | Miller | 280/638 |
| 1,828,638 | 10/1931 | Barrett | 280/638 |
| 1,852,984 | 4/1932 | Smith | 296/156 |
| 2,039,489 | 5/1936 | Messick | 410/52 |
| 2,159,671 | 5/1939 | Owen | 296/181 |
| 2,343,261 | 3/1944 | Marple | 296/156 |
| 2,543,349 | 2/1951 | Britton | 296/157 |
| 2,569,641 | 10/1951 | Metherell | 296/171 |
| 2,665,138 | 1/1954 | Tompkins | 280/41 |
| 2,691,533 | 10/1954 | Koonitz | 280/405 |
| 2,797,124 | 6/1957 | Hauptli | 296/26 |
| 2,841,094 | 7/1958 | Schumacker | 105/159 |
| 2,847,136 | 8/1958 | Neff | 214/500 |
| 2,862,253 | 12/1958 | Place et al. | 20/2 |
| 2,990,214 | 6/1961 | Watson | 296/171 |
| 3,152,837 | 10/1964 | Margala | 298/415 |
| 3,348,859 | 10/1967 | Melbye | 280/156 |
| 3,486,786 | 12/1969 | Howarth | 296/171 X |
| 3,542,415 | 11/1970 | Ratcliff | 296/27 |
| 3,612,589 | 10/1971 | Locher | 296/156 |
| 3,651,969 | 3/1972 | Bledsoe | 214/515 |
| 3,784,248 | 1/1974 | Neuman | 296/156 |
| 4,230,360 | 10/1980 | Eisenman | 296/181 |

FOREIGN PATENT DOCUMENTS

2031812  4/1980  United Kingdom .

Primary Examiner—David A. Scherbel
Assistant Examiner—Russell D. Stormer
Attorney, Agent, or Firm—Fisher, Christen & Sabol

[57] ABSTRACT

An expandable mobile house trailer which includes a relatively rigid main body portion having a floor structure and opposite pairs of vertical side and end walls thereabout. Two parallel arch beam supports are located inside of the main body portion. Each of the arch beam supports is positioned adjacent to and affixed to one of the vertical side walls of the main body portion. The ends of the floor are attached to the corresponding ends of the two arch beam supports. A plurality of vertical structural tension members is affixed at spaced intervals to each of the two arch beam supports. The floor is suspended from the lower ends of the vertical structural members. Two of the structural tension members on each of the two arch beam supports are paired, act as main support members and have substantially more structural strength than the other structural tension members. The floor of the main body portion has a wheel well opening on each side between the two paired structural tension members. There are two wheel units which each includes at least one wheel. Each of the wheel unit means is positioned in one of the wheel well openings and is mounted on each end to one of the paired structural tension members. The wheel of each of the two wheel units means is movable in a horizontal line which is parallel to the line of travel of the trailer. There is also a relatively rigid upper body section having a roof structure and vertical side and end walls which correspond, respectively, to and are positioned outside of the side and end walls of the main body portion. The upper body section is telescopically associated with the main body section. There is an arrangement for reacting between the main body section and the upper body section for raising and lowering the upper body section with respect to the main body section in the telescopically associated relationship.

15 Claims, 22 Drawing Figures

EXPANDABLE MOBILE TRAILER

FIELD OF THE INVENTION

The invention relates to mobile trailers, particularly mobile house trailers, which are collapsible and expandable. The invention also relates to mobile trailers which have load-distribution adjustment capability.

BROAD DESCRIPTION OF THE INVENTION

An object of the invention is to provide mobile vehicle trailer constructed to permit the body portion thereof to be adjusted with respect to the wheels thereof into a position whereby the body portion is properly weight balanced. Another object of the invention is to provide a suspension structural system for a mobile vehicle trailer. A further object is to provide an expandable trailer. A still further object is to provide a secure door system for a mobile vehicle trailer. Other objects and advantages of this invention are set out herein or are obvious herefrom to one ordinarily skilled in the art.

The objects and advantages of the invention are achieved by the trailer of the invention.

The invention involves a collapsible or expandable mobile house trailer. The trailer includes a relatively rigid main body portion having a floor structure and opposite pairs of vertical side and end walls positioned above the floor. Two parallel arch beam supports are located inside of the main body portion. Each of the arch beam supports is positioned adjacent to and affixed to one of the vertical side walls of the main body portion. The ends of the floor of the main body portion are attached to the corresponding ends of the two arch beam supports. A plurality of vertical structural tension members is affixed at spaced intervals to each of the two arch beam supports. The floor is suspended from the lower ends of the vertical structural members. Two of the structural tension members on each of the two arch beam supports are paired, are main support members and have substantially more structural (tension, flexural and compression) strength than the other structural tension members. The floor of the main body portion having a wheel well opening on each side thereof between the two paired structural tension members. There are two wheel means which each includes at least one wheel. Each of the wheel means is positioned in one of the wheel well openings and is mounted on each end to the lower portion of one of the paired structural tension members. The wheel of each of the two wheel means is movable in a horizontal line which is parallel to the line of travel of the trailer (or the side of the trailer). There is also a relatively rigid upper body section having a roof structure and substantially vertical side and end walls which correspond, respectively, to and are positioned outside of the side and end walls of the main body portion. The upper body section is telescopically associated with the main body section. The upper body section provides tight and weatherproof enclosure of the main body portion when the trailer is in the expanded position or the collapsed position. There is means reacting between the main body section and the upper body section for raising and lowering the upper body section with respect to the main body section in the telescopically associated relationship. Such means is preferably a mechanical slide system powered by human effort or a motor(s).

The trailer of the invention has the capability of easily having the position of its wheels relative to the rest of the trailer adjusted (forwards or backwards) to effect a balance of the trailer. The correct relative position depends upon the center of gravity of the trailer and its load, if any. There is a mechanism adapted to shift or move the trailer wheels relative to the remainder of the trailer.

The trailer of the invention is a livable trailer, termed "The Computer Home", which enriches the art of year around living on wheels. In this day and age, when all is so expensive, it may be advisable for many families such as, young couples, working couples, military and retired older couples, to consider miniturizing all phases of day-to-day living in order to accomplish all that is desired and necessary for health, comfort, happiness and tranquility. In search of a solution to this massive problem of living, the invention trailer home, a new concept of year around living, scales down in size and cost daily living to where it is manageable and affordable, yet the trailer home still accomplish everything in the art. It accomplishes to the fullest the living requirements expected of a conventional home, a trailer home, a travel trailer or a combination of any of these. The present demand of immediate readiness for a long weekend, a month, a year or possibly the rest of one's life away from work is provided for by the trailer invention home. One can just hook-up and go.

The invention develops a floor plan with a greater area to contain the function of living on a miniaturized basis with split level. To save the space normally lost in the chassis area of the underbelly, the chassis is replaced by a cable suspension bridge type curved tube which works in reverse. All the superstructure at the underbelly is moved to a network of ribs to form the hull. To solve the problem of weight displacement, a weight distribution system is used to adjust the tung weight for safe smooth towing and retain conventional vehicle suspensions for a comfortable ride when not towing. The fresh water tank is superimposed over the waste water tank between the wheels inside the basement. Fresh water used will return to the waste water tank immediately under the fresh water tank without weight displacement. The two feet expansion top makes adequate space in the living room and bedroom when raised, provides security from theft, from roll over in stormy weather and saves heating and air conditioning when lowered. In the lower position, all windows are blanketed to six inches view for inside light, security from theft, and roll over.

BRIEF DESCRIPTION OF THE DRAWINGS

The above and other objects and advantages of the invention will become apparent upon consideration of the following specification and the accompanying drawings wherein there is disclosed preferred embodiments of the invention.

In the drawings.

DETAILED DESCRIPTION OF THE INVENTION

The preferred embodiments of the invention are described in detail below.

Figure 1:
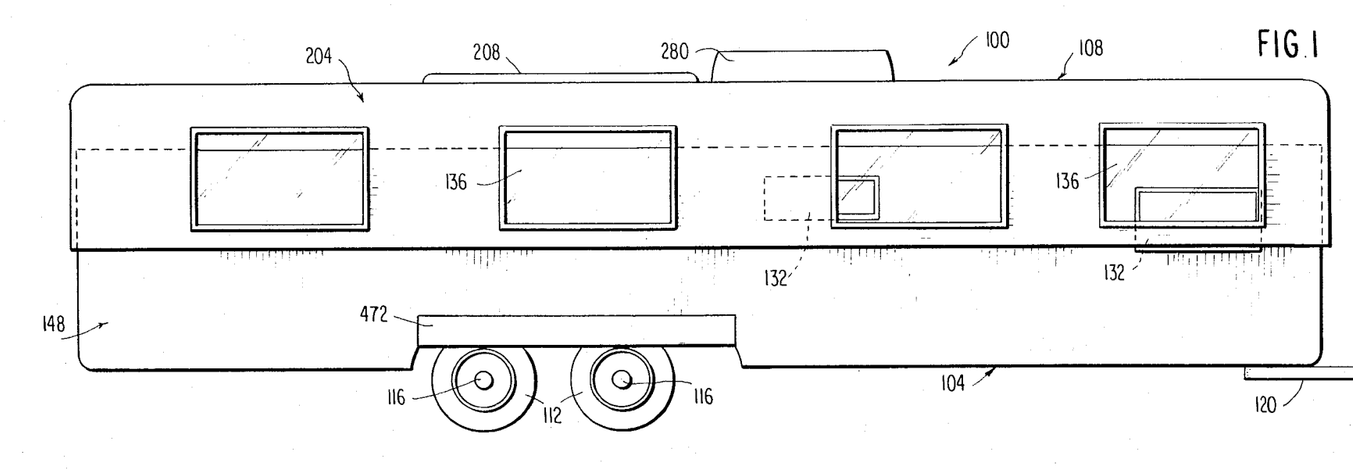
FIG. 1 is a side elevational view of one embodiment of the expandible, mobile, house trailer of the invention, with the trailer in the collapsed road or travel mode.
Figure 6:
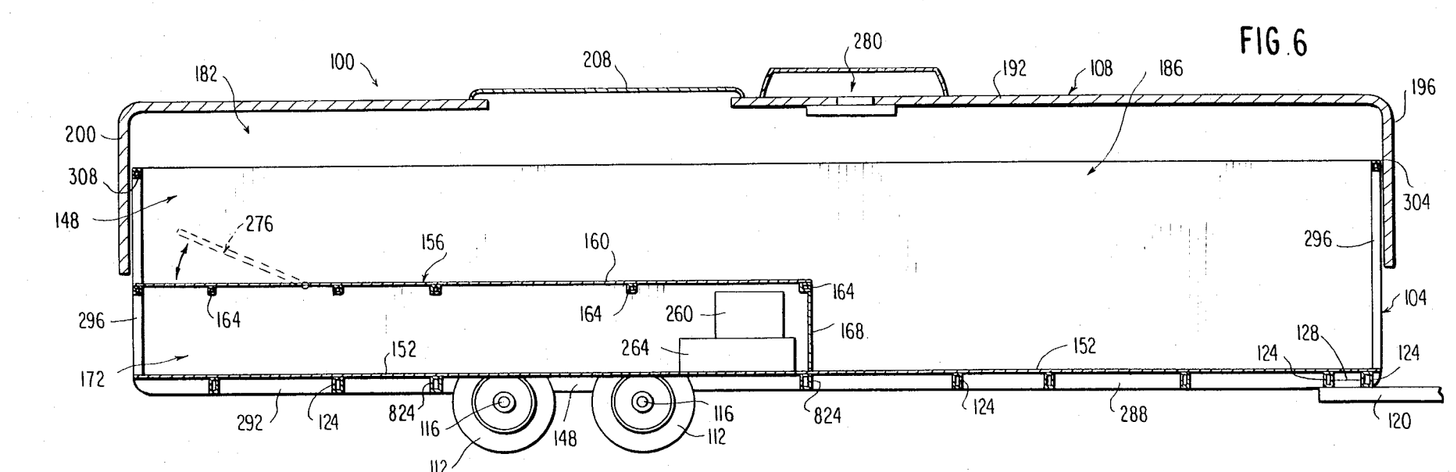
FIG. 6 is a lengthwise cross-sectional view of the trailer of FIG. 1 in the collapsed mode.

In FIG. 1, the expandable mobile, home, trailer of the invention is indicated by numeral 100. Trailer 100 has main (lower) body portion 104 and upper body portion 108. FIG. 1 shows trailer 100 in the collapsed, road position or mode. Main body portion 104 is mounted on wheels 112 (two wheels on each side are shown and preferred, but one or more wheels can be used on each side)—the manner mounting wheels is discussed below and shown in other drawings therein. Wheels 112 are rotably mounted on axles 116. The usual trailer hitch 120 (only partially shown) is affixed to the bottom of the front frame of main body portion 104. Referring to FIG. 6, trailer hitch 120 is affixed to two frame cross beams connecting short beam 128. Trailer hitch 120 may also be equipped with any usual leveling or supporting screw device (not shown). Main body portion 104 has windows 132 and upper portion 108 has windows 136.

Figure 2:
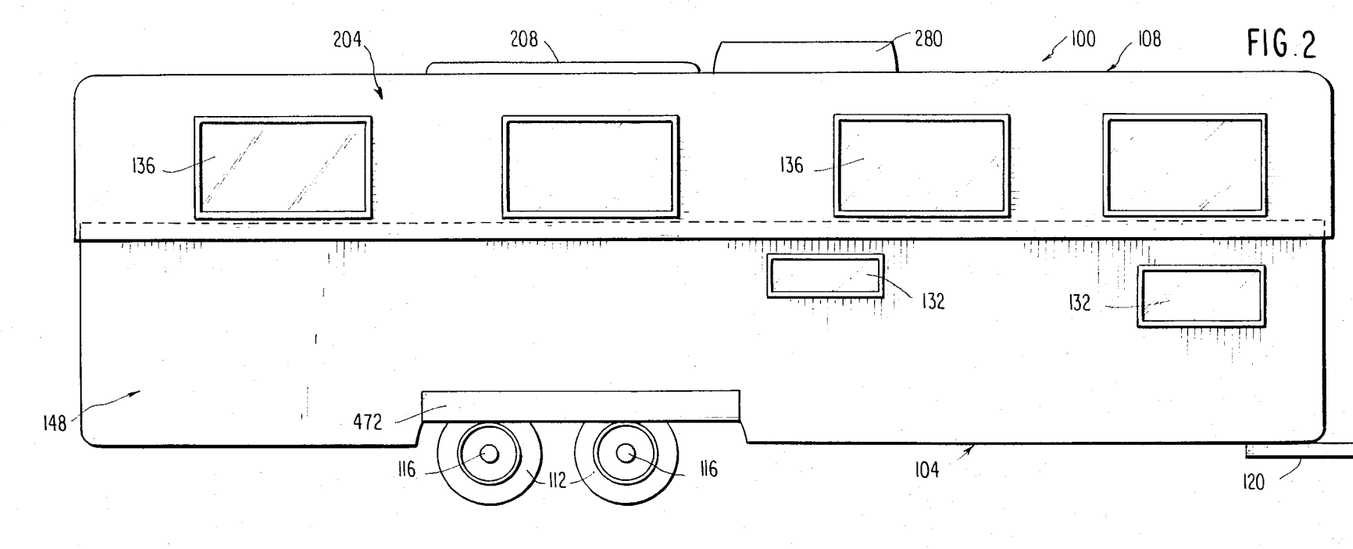
FIG. 2 is a side elevational view of the embodiment of FIG. 1, with the trailer in the expanded park or living mode.

The upper portion of main body portion 104 telescopically fits within upper body portion 108. FIG. 2 shows trailer 100 in the expanded, lining mode or position.

Figure 5:
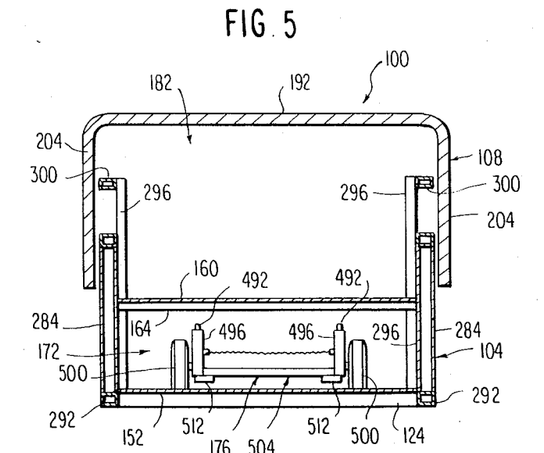
FIG. 5 is a cross-sectional view along line 5—5 in FIG. 3.
Figure 7:
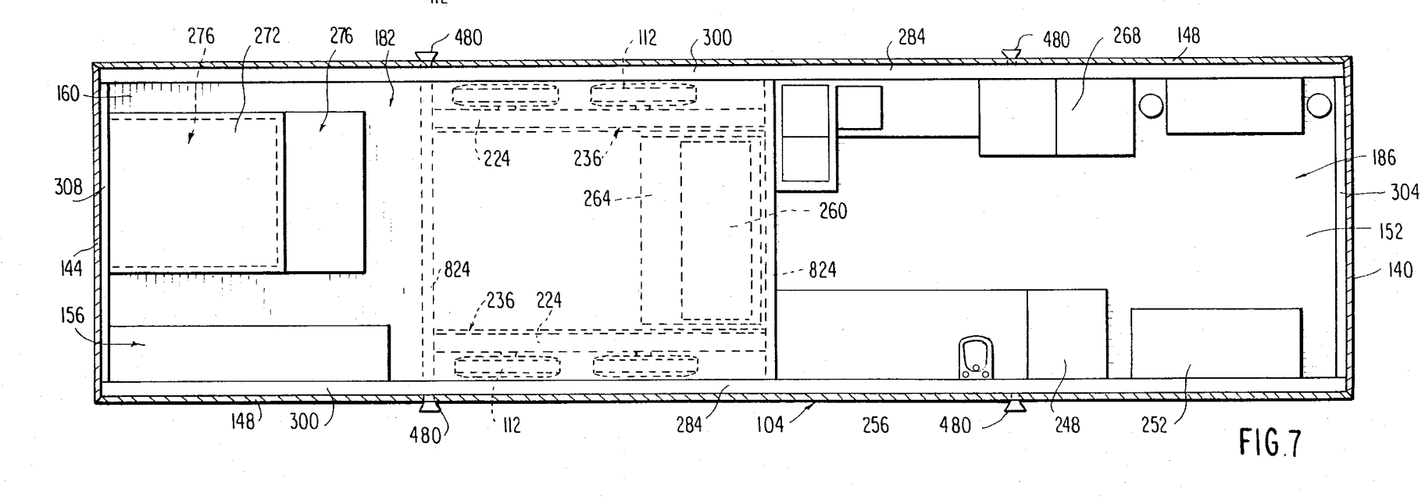
FIG. 7 is a top view of the bottom portion of the trailer of FIG. 1.

Referring to FIG. 7, main body portion has front wall 140, back wall 144, sides 148 and floor 152, which is supported on cross beams 124. The back half of main body portion 104 contains platform 156. Platform 156 has floor 160 mounted on cross beams 164 and base wall 168. Platform 156 forms boat storage (lower) compartment 172, which has an access door (not shown) in rear wall 144. Boat trailer 176 is shown in FIG. 5 in place in compartment 172, although any other suitable item or items can be stored therein. Platform 156 also forms bedroom-living area (upper) compartment or section 182. The front half of trailer 100 is main compartment or section 186. Upper body portion 108 has roof 192, front wall 196, back wall 200 and sides 204.

FIG. 6 shows sky roof 208 (preferably six feet long by five feet wide) in roof 192 of upper body portion 108 located over platform 156. Since sky roof (light) 208 can be reached by any grown person, the latching, unlatching and moving back and forward can be done by hand. The open area is completely screened (not shown) to keep bugs and flies outside. Upon unlatching sky roof (208), four springs (not shown) push it up to a position where it will clear the sky opening weather guards (not shown) and can then be rolled back and forth on two rails (not shown).

Figure 4:
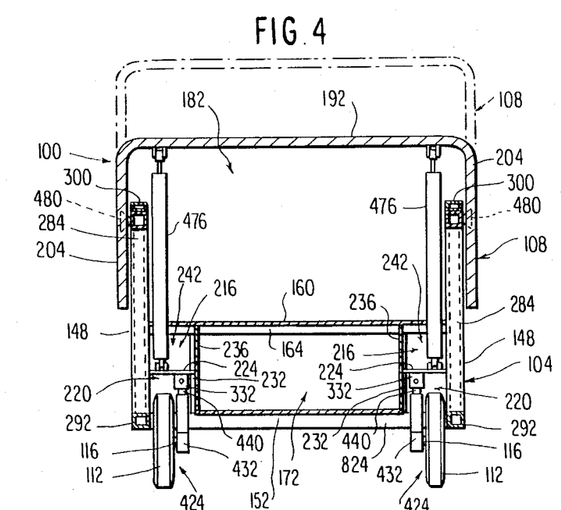
FIG. 4 is a cross-sectional view along line 4—4 in FIG. 3.

Under platform 156, on both sides, is a compartment 212 which has upper mechanical area 216 and wheel well 220. Each upper mechanical area 216 and wheel well 220 is separated by heavy plate 224. As shown in FIG. 4, the edge of floor 224 is mounted on each beam 232. Each compartment has inner side wall 236 and back wall 242.

FIG. 7 shows main compartment 186, wherein from front to center is the kitchen area with appliances including washer/dryer machine 248 superimposed, sofa/bed 252 and bathroom 256. This is a fully habitable area before expansion if conditions so require, such as a low profile during stormy weather or utilities savings during extreme weather conditions. Fresh water tank 260 is superimposed over waste water tank 264 between the wheel wells 220 inside of storage compartment 172. Weight distribution wise, this is a great improvement from conventional trailers since fresh water as used will return to waste water tank 264 immediately under fresh water tank 260 without weight displacement. All utility containers and pipings as such are located inside trailer 100 to avoid freezing or other destruction. Preferably storage compartment (basement) 172 is fifteen feet long by two feet high inside for stowing away from the living area, anything within reason from a golf bag with attachments to a fourteen foot light motor boat (176) to be used when the occasion presents itself.

FIG. 7 also shows compartment 182 for the living room and bedroom area on the split level floor above storage compartment 172. All furniture manufactured or constructed in place are no higher than three feet except refrigerator 268 and bathroom 256 which are in the kitchen area (186). This provides a panoramic view from any position throughout trailer 100. For example, a wide screen television set with the screen situated at the entrance door can be viewed from the entire area including the hospital type bed in the rear bedroom. Sliding roof 208 over living room 182 provides a sky view six feet long by five feet wide or more if desired in order to enjoy the sky and fresh air, to give a feeling of being outside and to take sun baths in privacy. Inside entrance to the basement is via the raised construction under bed 272 by raising hospital type bed 272 to a right angle. A three foot wide entrance 276 is developed to the basement (172). This also gives an extra foot in height to a total of three feet, the size of the underbed.

at the entrance of the basement (172) for maneuvering. When the basement (172) is entered from the bedroom, a person has standing and maneuvering space in the underbed area.

Air conditioner 280 is located on roof 192 over the kitchen area of compartment 186.

In the road position, trailer 100 is typically eight feet four inches high (exterior top from ground). The kitchen area (186) is then six feet seven inches inside height which are normal height for trailers. The living room and bedroom (182) on the split level floor are then four feet three inches inside height which is accessible in a bent position before expansion. However, the kitchen (186) is fully equipped for habitation before expansion for an indefinite period since sofa bed 252 and bathroom 256 are also on that level. Note that at the on road (collapsed) position windows 136 are blanketed to typically six inches view which provides security from theft. The on-road position also provides security from roll over and stormy weather since the height has been lowered and the center of gravity is definitely at rock bottom, all weights being on the lower floor one foot four inches from the ground.

The park or expanded position, after a typical two foot expansion, increases the inside height of the living room and bedroom 182 to a normal acceptable six feet three inches inside height. This is the normal position for habitation when parked except when going away the roof may be lowered to the road position for utilities savings by reducing the cubic space to be heated and air conditioned. Windows 136 are automatically closed to about six inches for security from theft and the outside height is reduced two feet for security from stormy weather.

Figure 3:
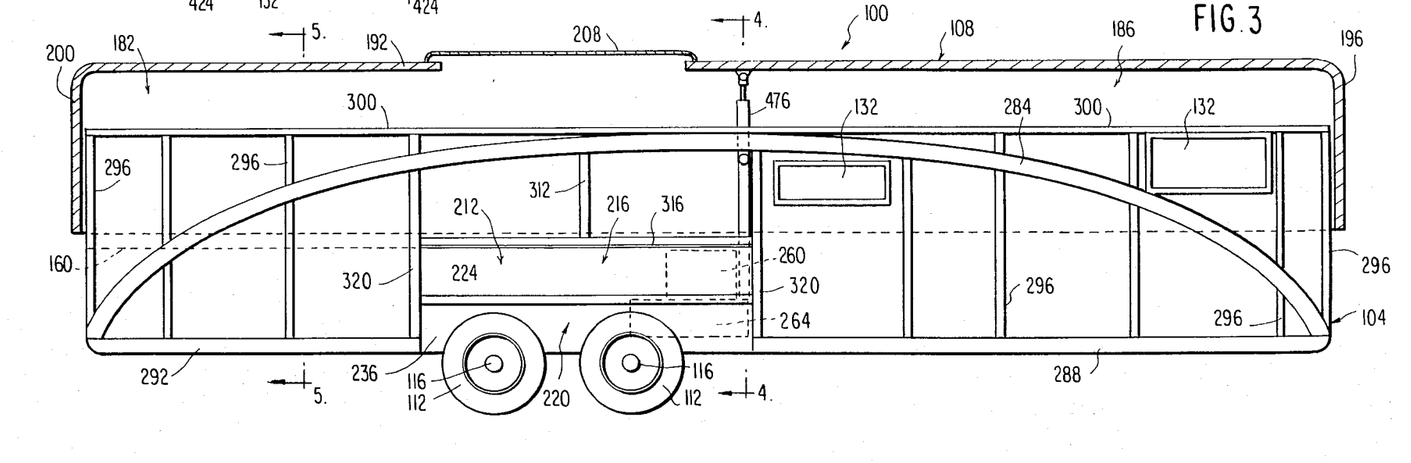
FIG. 3 is a side elevational view of the embodiment of FIG. 1, with the side facing walls cutaway, showing the structural features of the trailer.

The main strucutral system of trailer 100 is shown in FIG. 3. Arc beam 284 acts similar to a cable suspension bridge, but with the arc in reverse. Arc beam 284 is shown in FIGS. 4 and 5 as a rectangular tube (preferred) in cross-section, but its cross-section can have any solid or tubular shape such as circular, square, oblong, trinagular. Tubular is preferred for weight saving purposes. The front end of each arc beam 284 is affixed (preferably welded) to the outside end of horizontal beam segment 288. The rear end of each arc beam 284 is affixed (preferably welded) to the outside end of horizontal beam segment 292. Beam segments 288 and 292 are shown as rectangular tubes (preferred), but they also can have any convenient solid or tubular cross-section. Cross beams 124 are the bottom part of generally ⊔-shaped side supports 296. Tubular beams 300 are located inside of and at the top of side walls 148 and each is affixed at its mid-points on top of an arc beam 284—this is best seen in FIGS. 3 and 7. Tubular beams 304 and 308 are located inside of and at the top of front wall 140 and end wall 144, respectively.

⊔-shaped side (tension) supports 296, which are preferably tubular and rectangular in cross section, are welded (or otherwise affixed) to both arc beams-see FIG. 5. The upper ends of ⊔-shaped side supports 296 are welded to both top side beams 300. Supports 296 curve under floor 152 as beam portions 124 and support floor 152. Cross beams 164 are welded on both ends to the vertical arms of supports 296 (or their equivalent). Verticular tubular (tension) supports 312 are short and only extends from tubular top beam 300 to short horizontal beam 316. ⊔-shaped side (tension) heavy supports 320 having bottom cross-beam section 824 are similar in shape and location to ⊔-shaped side supports 296, except that side supports 320 to have to be considerably stronger (i.e., stronger structurally) and provide sufficient tension, flexural, lateral and compression strength. The ends of each short horizontal beams 316 are affixed (preferably welded) to the vertical arms of side supports 320. Floor 224 in each compartment 212 is metal (preferably steel) and is thick enough to provide the necessary strength to serve the functions explained below. Each side of each end of floors 224 are welded (or otherwise affixed) to a vertical arm of side supports 320. Vertical short support beams 324 are welded to the appropriate upper cross beam 164 and the bottom segment of the appropriate side supports 320.

Figure 8:
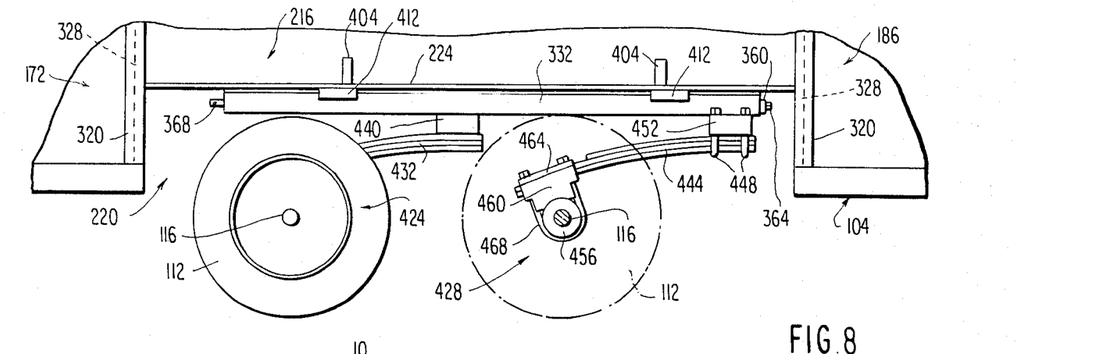
FIG. 8 is a side elevational view of embodiments of the wheel system of the trailer of FIG. 1.

Each end of compartments 212 is heavy metal plate 328, which is welded on its edges to support 320, cross beam 164 and vertical beam 236.—see FIG. 8. Each end of floors 224 are welded to vertical plates 328.

Figure 9:
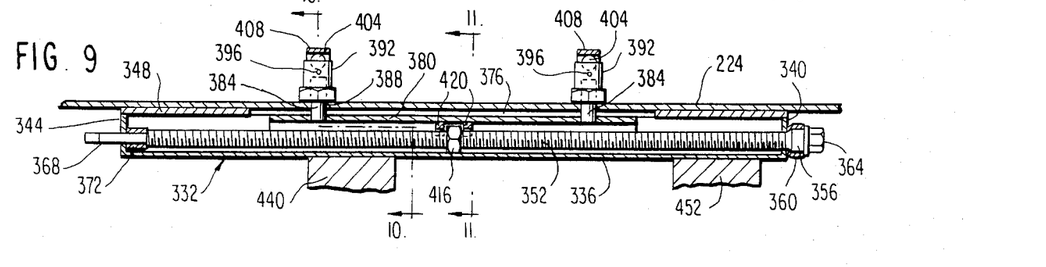
FIG. 9 is a longitudinal cross-sectional view of the load adjustment system of the invention.

Metal (steel) box 332 is composed of bottom box portion 336 (having front end 340 and rear end 344) and lid 348. Jack-type screw 352 extends all of the way through box 332 and is rotatably mounted at its ends in box end walls 340 and 344, as shown in FIG. 9. Front end 356 of elongated screw 352 is wider in diameter, fitting within mating tube 360 affixed to front wall 340. A bearing can be present between front end 356 and mating tube 360. Nut portion 364 is located on the extremity of front end 356. Back end portion 368 of elongated screw 352 fits through bushing 372 and is smaller in diameter than the threaded part of screw 352. After removing cotter pin 228, screw 352 can be removed out the front side by unscrewing it out of nut 416.

Figure 10:
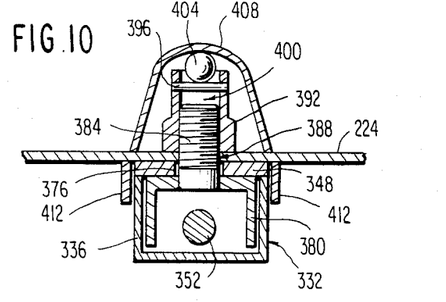
FIG. 10 is a transverse cross-sectional view along line 10—10 in FIG. 9.
Figure 11:
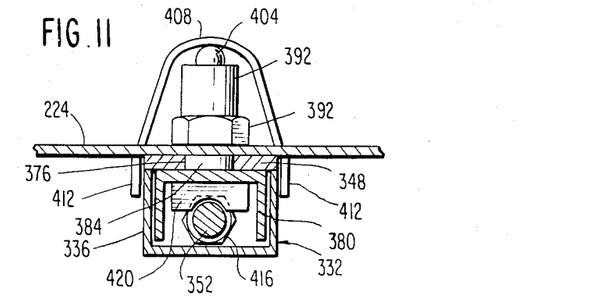
FIG. 11 is a transverse cross-sectional view along line 11—11 in FIG. 9.
Figure 12:
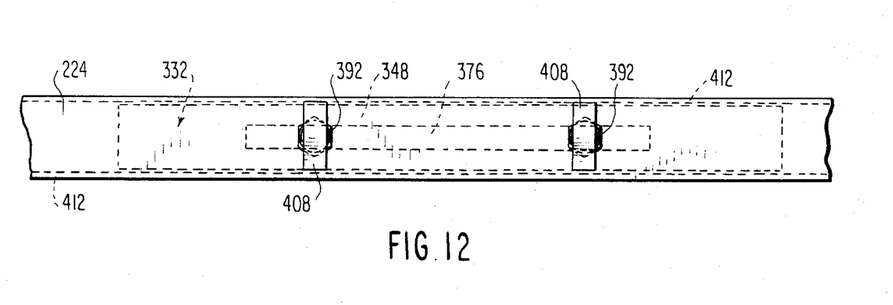
FIG. 12 is top view of the load adjustment system of the invention where a beam support system is used instead of a floor support system.

Top lid 348 of box 332 contains elongated slot 376. Inverted ⊔ or channel member 380 contains threaded pins 384. Threaded pins 384 fit up through elongated slot 376 and through holes 388 in the bottom of floor 224. Rotatable (internally-threaded) units 392 are located on the top surface of the bottom plate of beam 224. Pins 384 are threaded into rotatable units 302. When rotatable units 392 tighten up, boxes 332 are fixed in place. To adjust the position of boxes 332, can be moved to any desired location within the confines of the length of slots 376. In this fashion the position of the wheels (as explained below) can be adjusted to balance the weight distribution of trailer 100 and its load. Pin 396 fits across passageway 400 of rotatable unit 392. Pin 396 prevents the downwards movement of ball bearing 404 without hindering its rotation or turning movement. Inverted-∧ strap 408 holds ball bearing 404 in place and accordingly holds rotatable unit 392 in place when pin 384 is completely removed (unthreaded). Guide strips 412 are located on the bottom edges of beam 224 in the areas of rotatable units 392. Nut 416 (internally-threaded) is rotatably mounted on elongated screw 352. A retaining plate 420 is mounted from the top plate portion of channel member 380 on each side of nut 416. Each retaining plate 420 can contain a small groove so as to closely fit around the top region of elongated screw 352. Retaining plates 420 prevent lateral movement of nut 416 and hold it in the present location when elongated screw 352 is rotated in either direction. This means that when elongated screw 352 is rotated by means of a wrench or the like applied to nut portion, box 332 is moved. (The movement of box 332 or screw 352 can also be done hydraulically.)

Figure 13:
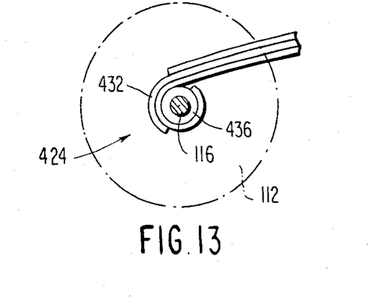
FIG. 13 is partial view of a wheel embodiment of the invention.

Two wheel units 424 and 428 are mounted on the bottom of each box or carriage 332. (Two wheel units are preferred, but one or more than two wheel units can be used on each side of trailer 100.) Referring to FIG.

13, the end leaf spring 432 is lapped around and welded to busing 436 on axle 116 (upon which wheel 112 is rotatably mounted). FIG. 13 deals with preferred wheel unit 424. The other end of leaf spring is welded to the bottom of block 440 and the top of metal block 440 is welded to the bottom of box or carriage 332.

Another version of the wheel units is wheel unit 428-see FIG. 8. One end of leaf spring 444 is attached to the bottom of box 332 by U-bolts 448 which extend through block 452 and the bottom of plate of box 332, being affixed by nuts located in channel 336. The nuts, etc., must be located so as not to interfer with the functioning of elongated screw 352. Wheel 112 is rotatably mounted on axle 116 which contains bushing 456 on its inside end. The end of leaf spring 444 is located in a groove between block 460 and plate 464 by means of U-bolts 468. Bolts 468 also hold block 460 against bushing 456.

Longitudinal movement of wheel units 424 and 428 is brought about by longitudinal movement of box 332, which is caused by rotation of screw 352 by the turning of nut end 364 thereof. Access from the side of trailer 100 into each upper mechanical area 216 and wheel well 220 is via flap 472. This allows the turning of nut sections 392 and nut end 364 as desired. Nut 416 is usually flush with the bottom of box 332 so that it will not rotate when elongated screw 352 is turned.

The weight distribution system of the invention is designed to operate with or without shock absorbers. It can be powered by hydraulic or jack type screw. The container to house either power system can be permanently lubricated when powered by the jack mechanism. The unit without shock absorbers is technically maintenance free. In view of the weight distribution system, the load is adjustable to the best weight for smooth safe towing without changing the conventional car suspension thereby retaining the usual smooth comfortable ride when not towing.

The means for raising or lowering upper body portion 108 are hydraulic jacks 476. [The motor(s) and hydraulic lines for hydraulic jacks 476 are not shown-although the motors can be located in mechanical compartments 216.] The upper end of each hydraulic jack 476 is affixed to roof 192, and the lower end of each is affixed to floor 228 (as shown in FIG. 4).

Figure 4A:
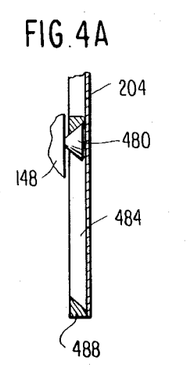
FIG. 4a is a cutaway sectional view of the guidance system shown in FIG. 4.

Four ▷ -shaped pins 480 are spaced on the sides (148) of main body portion 104 as shown in FIG. 7. The ends of pins 480 fit in channels 484 correspondingly mounted on the inside of the sides (204) of upper body portion 108 as shown in FIGS. 4 and 4A. Channels 484 have top lips which keep pins 480 therein. When assemblying or dissassemblying trailer 100, plugs 488 are removed (e.g., removing holding pins or screws, not shown) from the end of channels 484 so that pins 480 can be inserted or removed, respectively.

The walls around main body portion 104 are preferably aluminium. For example, 2 ½ inches of insulation are placed between the inner and outer walls. Upper body portion 108 preferably composes an aluminium outer skin, and an inner wall, spaced apart. A ribbing support network and a layer of insulation are located between the outer skin and inner wall.

Boat trailer 176 handles a boat in the basement as well as on the road. It should be towed at reasonable speeds due to its light construction. It is designed to be inserted in basement compartment 172 with the boat (not shown) in position for permanent storage, except the engine and the two wheels which should be removed and placed in the boat. The framework 504 of boat trailer 176 is built of strong light special alloy with the usual rubber supports 492 for the boat and a securing post (not shown) for the bow. Side guide posts 496 at the wheels 500 contain built in coil spring suspension 508 and have a clamp (not shown) at the top to secure the boat on the boat trailer 176. The underbelly of the boat trailer 176 has rubber rollers 512 to slightly lift the trailer and roll it on the floor. As the wheels approach the entrance door boat trailer 176 and the boat are sufficiently advanced and stable to remove both wheels 500 to be stowed in the boat. When boat trailer 176 is in position it is secured to the floor with two bolts to keep boat trailer 176 stable.

Figure 14:
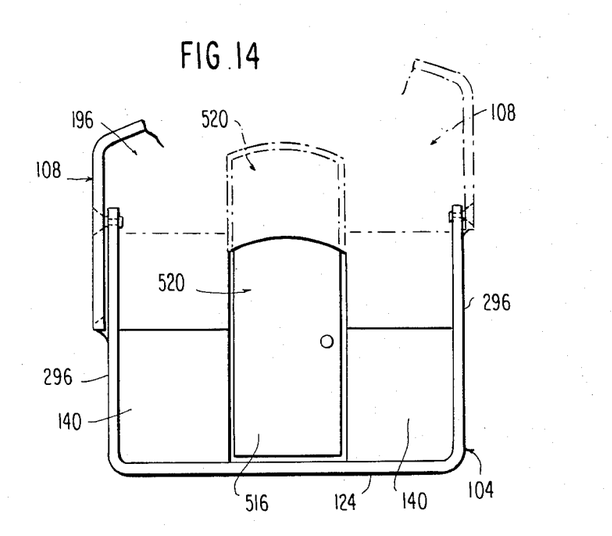
FIG. 14 is a front elevational view of the trailer of FIG. 1 showing the door.
Figure 15:
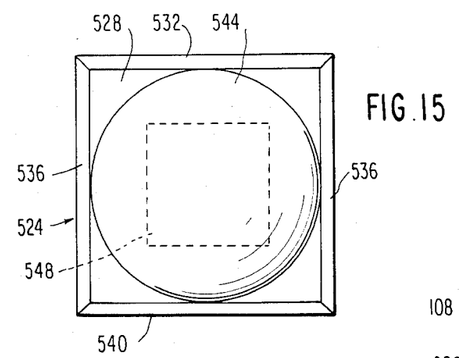
FIG. 15 is a front elevational view of the front trailer cover of the invention.

FIG. 14 shows one embodiment of the door facilities of the invention. When upper body portion 108 is in the collapsed position, outwardly opening door 516 cannot be opened. Of course, one can have door 516 open inwardly but such arrangement loses the burglar proof aspect of the first arrangement. (Door 516 also has a lock.) Front wall 196 of upper body portion 108 has cutout portion 520 which is as wide as door 516. When upper body portion is in the up or expanded position, all of door 516 is exposed so that door 516 can be opened outwardly. There would have to be an external switch (preferably lockable) to operate hydraulic lifters 476.

The invention also includes the embodiment shown in FIGS. 15 to 21. Swingable front cover 524 is shaped like an aircraft rounded nose, but can also be any other shape similarly designed to reduce air resistance thereby saving fuel and which also protects the glass front door 516 (see FIG. 14) against weather elements and rocks when towing in the road position. It is the installation area for the front running lights, flood lights, outside entrance light, television, radio and CB unit antennas and any other desired small instruments.

Figure 21:
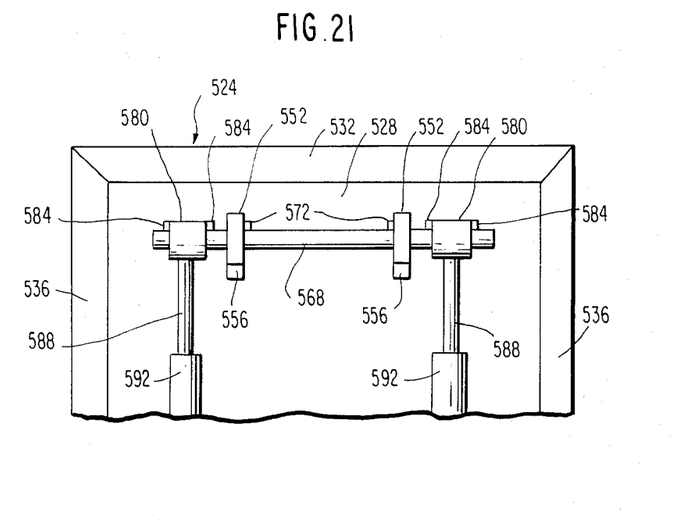
FIG. 21 is partial, back elevational view of the front trailer cover of FIG. 15.

Swingable front cover 524 includes flat plate 528, with sloping top plate 532, side sloping plates 536 and bottom sloping plate 540, and dome 544 mounted on the front side of flat plate 528. Access door 548 can be hingedly mounted in the center of flat plate 538 for entry into dome 544 (see FIG. 15). The two gear boxes 552 contains plate 556, which is welded to the backside of flat plate 528 (see FIG. 21), hole 560 and gears 564, which are aligned linearly (see FIG. 18). Tube 568 extends through holes 560 as seen in FIG. 21. Pins 572 affixed on tube 568 keeps lateral movement of tube 568 in relation to gear boxes 552. Gears 576 are located about halfway around the circumference of tube 568 and mesh with gears 564. Gear 576 and gears 564 allows movement of tube 568 within hole 560 away from or towards flat plate 528 as tube 568 turns.

The two short tubes 580 rotatably fit over tube 568 and are kept in lateral position on tube 568 by pins 584 on tube 568. Each arm 588 is attached on one end to a short tube 580 (perpendicular relationship) and the other end is positioned in tube 592 in a telescopically associated relationship (see FIG. 19). Pin 596 is inserted into any of mating passageways 600 through arm 588 and tube 592 to affixedly position arm 588 and tube 592 in relation to each other. A short tube 604 is attached in a perpendicular manner to the lower end of tube 592. The two short plates 608 are parallel and affixed to wall 140. Pin 612 holds short tube 604 between parallel plates 608 in a rotatable manner. The rotation arc of telescoping support unit 616 is restricted by the degree of play between pin 620 mounted on the bottom of tube 604 and block 624 mounted on wall 140. Rubber grommet 628 is located on the edge of sloping top plate 532, and rubber grommet 632 is located on the edge of sloping top plate 536.

Figure 16:
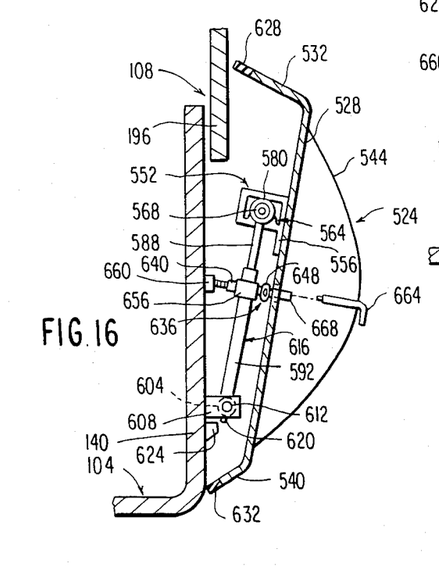
FIG. 16 is a side, partially cutaway, elevational view of the nose cover of FIG. 15 in closed position.

FIG. 16 shows front cover 524 in a vertical position against the front of trailer 100 (over most of the exposed portion of door 516). Front cover 524 is held in place by support unit 616 and attachment unit 636. Referring to attachment unit 636 includes tube 640 and shaft 644 which extends through tube 640. Thumb plate 648 on one end of shaft 644 prevents movement through tube 640. The other end 652 of shaft 644 is threaded. Clip 656 is pivotally attached on one end to tube 640 and fits over tube 592. Clip 656 can be slide up or down tube 592 as required. Threaded end 652 of shaft 644 is screwed into internally threaded short nipple 660 mounted on front wall 140 of main body portion 104, which draws front cover 624 tightly against front walls 140 and 196. Shaft 644 is turned by means of wrench 664, the square end of which fits into the square hole of short tube 668 mounted on the top of thumb plate 648. Each short tube extends through a hole in flat plate 528 (see FIGS. 16 and 20). A key locking device (not shown) can be mounted on bottom sloping plate 540 to lock front cover 524 to front wall 140.

Figure 17:
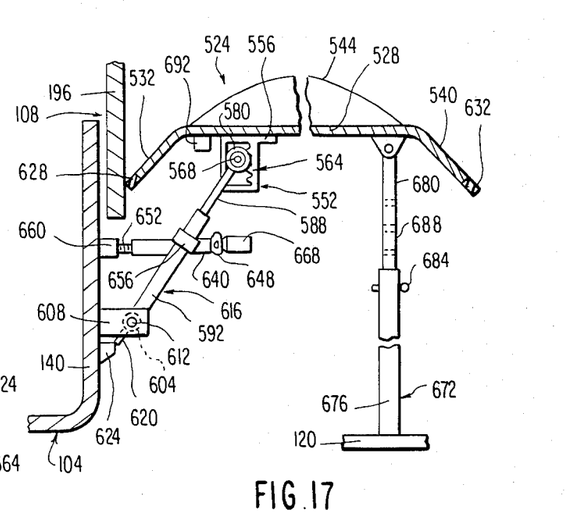
FIG. 17 is a side, partially cutaway, elevational view of the nose cover of FIG. 15 in open position.
Figures 18, 19:
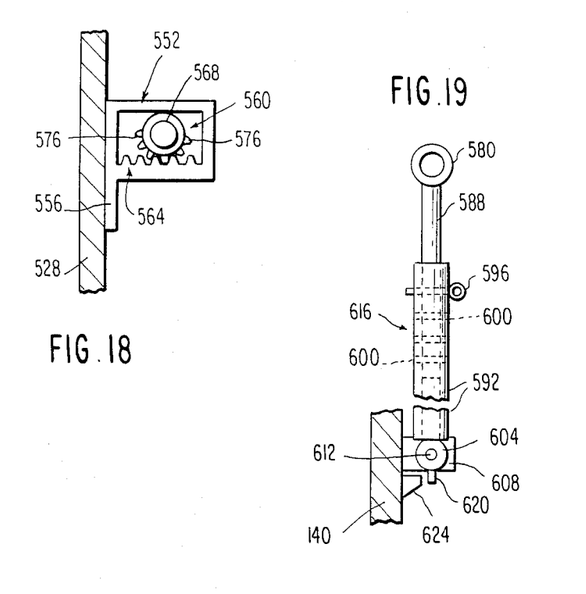
FIG. 18 is a side elevational view of the gear box of the nose cover of FIG. 15.
FIG. 19 is a side elevational view of the adjustable support tube of the nose cover of FIG. 15.
Figure 20:
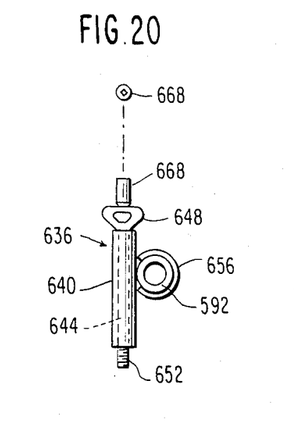
FIG. 20 is a side elevational view of the tightening device of the nose cover of FIG. 15.

FIG. 17 shows front cover 524 in a horizontal position, allowing access to door 516 and providing a "patio" or "shade" roof. Front cover 524 is held in place by support unit 616 and attachment device 636 and is supported on the outer portion by adjustable leg unit 672. The forward swing of support unit 616 is restricted by bottom pin 620 encountering small block 624. Adjustable leg unit 672 includes base tube 676 and arm 680, which is slidable in tube 676. The upper end of arm 680 is hinged on the bottom of flat plate 528 and the bottom of tube 676 sits on hitch 120. Pin 684 is inserted through any of mating passageways 688 through arm 680 and tube 676 to affixedly position arm 680 and tube 676 in relation to each other. When not in use, adjustable leg unit 672 is swung up against flat plate 528 and held in place by clip 692. Threaded end 652 of shaft 644 is screwed into one internally threaded short nipples 660 by means of thumb screw 648 (or short tube 668 and wrench 664)—this draws rubber grommet 628 tightly against front wall 196.

Changing the positions of front cover 524 in either FIG. 16 or FIG. 17 is done by unscrewing threaded end 652 of shaft 644, partially or completely.

All electrical and other wiring does not enter roof 192 top and all equipment installed in the nose attachment 524 are readily accessible for maintenance at an appropriate height and angle via trap door 548. Special rubber rain gutters can be placed all around the base of dome 524 to act as a cushion to prevent vibrations, shocks, rattles, leaks and drafts when lowered and secured against the front of trailer 100 for towing. Front cover 524 is secured to the lower body 104 of and only the under part of the rubber rain gutters lightly presses against upper body portion 108 so as to permit the upper body portion 108 to still move up and down with ease.

When front cover 524 is raised to the park position, it provides a shelter for the entrance with adequate rain gutters expect possibly during abnormal rain storms. If desired, a support pipe housed under front cover 524 can be snapped into place as a drain pipe for the rain gutters. A front porch floor can be used which is hinged so that it rests on tongue 120 when lowered and fits upright to fill in the area under front cover 524 when it is in the road position in order to provide a uniform contact for the rubber rain gutters when towing. There can be two small hideaway steps providing access from either side of tongue 120.

What is claimed is:

1. An expandable mobile trailer comprising:
   (A) a relatively rigid main body portion having a floor structure and substantially opposite pairs of vertical side and end walls above the floor;
   (B) two parallel arch beams located inside of the main body portion, each of the arch beams being positioned adjacent to and affixed to one of the vertical side walls of the main body portion;
   (C) a plurality of vertical structural tension members affixed at spaced intervals to the outer portions of each of the two arch beams, the floor structure being suspended in tension from the lower ends of the vertical structural tension members;
   (D) at least two vertical support structural members on each side of the main body portion, the lower ends of each set of the vertical support structural members being attached to the central portion of the edges of the floor structure, the central portion of the each arch beam being mounted on the upper end of each set of the vertical support structural members, thereby the vertical support structural members being in compression, and the vertical support structural members having substantially more structural tension, flexural and compression strength than the vertical structural tension members;
   (E) the floor of the main body portion having a wheel well opening on each side between the two sets of vertical support structural members;
   (F) two wheel means which each includes at least one wheel, each of the wheel means being positioned in one of the wheel well openings and mounted on each end to the floor structure between one set of the vertical support structural members, the wheel of each of the two wheel means being movable in a horizontal line which is parallel to the line travel of the trailer;
   (G) a relatively rigid upper body section having a roof structure and substantially vertical side and end walls corresponding, respectively, to and positioned outside of the side and end walls of the main body portion, and being telescopically associated with the main body section; and
   (H) means reacting between the main body section and the upper body section for raising and lowering the upper body section with respect to the main body section in the telescopically associated relationship.

2. The trailer as claimed in claim 1 wherein means to detachably affix the trailer to a vehicle is mounted on one end of the trailer.

3. The mobile trailer as claimed in claim 1 wherein, located in the main body portion, there is located a three-compartment sink device comprising in combination an L-shaped stand, a sink having three compartments arranged in an L-shape and mounted in the top surface of the L-shaped stand, a garbage disposal, and at least one water faucet being located above or in the upper region of one of the three compartments, and at least one of the three compartments having a drain hole, the garbage disposal being located in the drain holes being capable of being connected to a waste-water storage tank, and each of the water faucets being capable of being connected to a fresh-water storage tank of other source.

4. The mobile trailer as claimed in claim 3 wherein a butane tank is located in a bottom space of the sink device, said space being enclosed except for an opening on one end for removal or insertion of the butane tank.

5. The mobile trailer as claimed in claim 1 wherein, located in the main body portion, is a desk-vanity-sewing machine combination device comprising in combination a cabinet having an upright piano-like shape, a vertical wall separating the interior of said cabinet into a front chamber and back upper and lower chambers, a desk top, having a hinged front portion, a vanity cover, which is hinged on the top edge of the vertical wall and which is located on top of the front chamber below the desk top, an invertible sewing machine mounted on the bottom of the front chamber or a vertical shelf therein, and front support legs mounted at the edge of the front chamber, said desk top exposing said upper back chamber and said vanity cover when it is lifted up.

6. The mobile trailer as claimed in claim 4 wherein a butane heater is located in the back lower chamber and a vent is located in the front vertical wall of the back lower chamber.

7. The mobile trailer as claimed in claim 1 wherein, located in the main body, is a sofa-bed-dining table combination device comprising in combination two back supports, which are spaced apart from each other and which are capable of being mounted on a wall or the like, two horizontal hollow cylindrical members, which are spaced apart from each other, which are affixed to the bottom of the two vertical back supports and which are capable of being mounted on one end in a wall or the like, an elongated top slot traversing most of the length of each of the horizontal hollow cylindrical members on the end of away from the wall, a cabinet located in a horizontal position between the two horizontal hollow cylindrical members, two wheel units, which are each affixed in a horizontal position on one of the ends of the cabinet, the wheel of each wheel unit rotatably positioned in the elongated top slot of one of the horizontal cylindrical members, a short vertical support mounted on the front edge of the cabinet to support it, a table top hinged on its top edge to the front edge of the cabinet, a horizontal cushion positioned on top of the horizontal cabinet, vertical cushion hinged to the two vertical back supports, so that the vertical cushion is slightly slanted outwards cushion in place and the cabinet is in position against the two vertical back supports, and hinged supports pivotally affixed to the bottom of the cabinet which serve as supports for the table top when it is in an upwardly pivoted position, said hinged supports fitting flush against the cabinet when not in use, the device forming a sofa when the cabinet is in position against the wall, the device forming a bed when the device is partially positioned away from the wall, with the vertical cushion now against the two back supports, the device forming a cabinet when the device is fully positioned away from the wall, with the cabinet and top cushion rotated into a vertical position, and the device forming a dining table when the table top of the vertically-positioned cabinet is swung up into a horizontal position by means of one end of the table top being hinged to the top of the cabinet.

8. The mobile trailer as claimed in claim 7 wherein the two wheel units are completely located within slots in the back of the cabinet aligned with the wheels of the wheel unit and wherein the two horizontal hollow cylindrical members extend through the two vertical slots.

9. The mobile trailer as claimed in claim 1 wherein a split level floor is provided over the floor structure from the rear to the center of the main body portion of the trailer providing a basement on the floor structure of the main body portion and providing living space on the split level floor to increase the useable floor area.

10. The mobile trailer as claimed in claim 1 wherein a basement unit is provided under the floor structure between the two wheel means, thereby forming two wheel wells.

11. The mobile trailer as claimed in claim 10 wherein, in the basement unit, a structural fresh water tank, superimposed over a waste tank, are located.

12. The mobile trailer as claimed in claim 1 wherein means (H) for raising or lowering the upper body section with respect to the main body section is hydraulically-operated means.

13. The mobile trailer as claimed in claim 1 wherein the trailer has a door in the front end thereof, and a front cover hinged on its top over the door or on its side beside the door, thereby preventing entry into the trailer through the door when in its closed position.

14. The mobile trailer as claimed in claim 1 wherein means to detachably affix the trailer to a vehicle is mounted on front end of the trailer, and a leveling device to level the trailer when the towing vehicle is detached is mounted on the trailer mounting means.

15. The mobile trailer as claimed in claim 1 wherein each wheel means includes a weight distribution system to secure the wheel assembly to the main trailer body and to transfer the weight of the main trailer body from the top of the weight distribution system to the inside bottom by means of a weight transfer mechanism, incorporated therein and to adjust the tung weight of the trailer for smooth safe towing without changing the towing vehicles' conventional suspension, the weight transfer mechanism comprises two master holding bolts, attached to the flatbed, resting and sliding or rolling on bearings inside the bottom of the weight distribution system, the weight transfer mechanism being attached to the floor structure and being stationary while the weight distribution system, with the wheel assembly attached, is displaced in relation to the trailer lightening, the two master holding bolts, located in compartment above the wheel well, securing the top of the weight distribution system to the underbody of the wheel well and the floor structure in a vice-like grip, untightening the master holding bolts causing the two master holding bolts to push down on the flatbed of the weight transfer mechanism inside the body of the weight distribution system and simultaneously push up against an arch assembly located above the wheel well and the floor structure, thereby forcing ajar the underbody of the wheel well and the floor structure from the top of the weight distribution system, such operation transfering the weight of the trailer by lifting the weight from the top of the weight distribution system, thereby eliminating the friction and transferring the weight to the inside bottom of the same unit by way of the flatbed of the weight transfer mechanism, activation of an elongated jack-type screw will cause the trailer to move in relation to the wheel assembly and whether it is touching the top part of the weight distribution system, the only friction being the flatbed of the weight transfer mechanism to which the trailer weight is transferred, the flatbed-type instrument sliding or rolling smoothly on bearings in the permanently-lubricated elongated box of the weight distribution system, the total unscrewing of the two master holding bolts permitting the removal of the weight distribution system intact with the wheel assembly for repairs or the like, road security for the trailer being assured by the underbody of the wheel well pressing against the entire length of the weight distribution system, as compounded by the weight of the trailer 100 and as secured by the two master holding bolts of the weight transfer mechanism.

* * * * *